US011385823B2

(12) United States Patent
Yang et al.

(10) Patent No.: US 11,385,823 B2
(45) Date of Patent: Jul. 12, 2022

(54) METHOD, ELECTRONIC DEVICE AND COMPUTER PROGRAM PRODUCT FOR REBUILDING DISK ARRAY

(71) Applicant: EMC IP Holding Company LLC, Hopkinton, MA (US)

(72) Inventors: Ke Yang, Beijing (CN); Zhenhua Zhao, Beijing (CN); Baote Zhuo, Beijing (CN); Zhihui Qiu, Beijing (CN); Sihang Xia, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 97 days.

(21) Appl. No.: 16/931,605

(22) Filed: Jul. 17, 2020

(65) Prior Publication Data

US 2021/0216231 A1    Jul. 15, 2021

(30) Foreign Application Priority Data

Jan. 15, 2020 (CN) .......................... 202010041339.1

(51) Int. Cl.
*G06F 3/00* (2006.01)
*G06F 3/06* (2006.01)
*G06F 11/10* (2006.01)

(52) U.S. Cl.
CPC .......... *G06F 3/0647* (2013.01); *G06F 3/0619* (2013.01); *G06F 3/0631* (2013.01); *G06F 3/0689* (2013.01); *G06F 11/1092* (2013.01)

(58) Field of Classification Search
CPC .... G06F 3/0647; G06F 3/0619; G06F 3/0631; G06F 3/0689; G06F 11/1092
See application file for complete search history.

(56) References Cited

U.S. PATENT DOCUMENTS

| 10,146,459 | B1  | 12/2018 | Gao et al. |
| 10,210,045 | B1  | 2/2019  | Gao et al. |
| 10,289,507 | B1* | 5/2019  | Malwankar ............. G06F 3/067 |
| 10,747,617 | B2  | 8/2020  | Gao et al. |
| 10,922,201 | B2  | 2/2021  | Ma et al. |

(Continued)

OTHER PUBLICATIONS

Wei Dong, et al.; "Method, Device, and Program Product for Data Rebuilding", United States U.S. Appl. No. 17/470,614, filed Sep. 9, 2021.

*Primary Examiner* — Reginald G Bragdon
*Assistant Examiner* — Michael L Westbrook
(74) *Attorney, Agent, or Firm* — BainwoodHuang

(57) ABSTRACT

Techniques for rebuilding a disk array involve, in response to receiving a message for rebuilding disk arrays in a storage system, determining a target disk that causes rebuilding. Such techniques further involve determining from the disk arrays a set of disk arrays related to the target disk, and generating subsets of disk arrays from the set of disk arrays, each subset including disk arrays that can be rebuilt in parallel. Such techniques further involve determining, based on a number of disks included in each subset, a target subset from the plurality of subsets, and rebuilding disk arrays in the target subset in parallel. Accordingly, a disk array that is most suitable for parallel rebuilding may be determined, and the process of rebuilding the disk array is sped up. Such techniques reduce the delay caused by performing rebuilding, and improve rebuilding efficiency.

16 Claims, 5 Drawing Sheets

(56) References Cited

U.S. PATENT DOCUMENTS

| | | |
|---|---|---|
| 11,036,602 B1 | 6/2021 | Tal |
| 11,194,663 B2 | 12/2021 | Norden |
| 2018/0018231 A1* | 1/2018 | Okada .................... G06F 3/064 |
| 2019/0057004 A1* | 2/2019 | Tripathi ................ G06F 3/0689 |
| 2020/0019464 A1* | 1/2020 | Barrell ................ G06F 13/1668 |
| 2021/0173742 A1 | 6/2021 | Zhuo et al. |
| 2022/0035708 A1 | 2/2022 | Armangau et al. |

* cited by examiner

METHOD, ELECTRONIC DEVICE AND COMPUTER PROGRAM PRODUCT FOR REBUILDING DISK ARRAY

CROSS-REFERENCE TO RELATED APPLICATION

This application claims priority to Chinese Patent Application No. CN202010041339.1, on file at the China National Intellectual Property Administration (CNIPA), having a filing date of Jan. 15, 2020, and having "METHOD, ELECTRONIC DEVICE AND COMPUTER PROGRAM PRODUCT FOR REBUILDING DISK ARRAY" as a title, the contents and teachings of which are herein incorporated by reference in their entirety.

FIELD

Embodiments of the present disclosure relate to the field of data storage, and more specifically to a method, electronic device and computer program product for rebuilding disk arrays.

BACKGROUND

With the development of storage technologies, disk arrays are used by more and more users store data. A disk array is a group of disks formed by combining a plurality of independent disks in different ways. The disk array for example may be a Redundant Array of Independent Disks (RAID), or a group of disks having other suitable structures/forms. From the user's perspective, the disk array is like a disk, but it may provide higher storage capacity than a single disk, and further provide data backup. The different ways of forming disk arrays are called RAID levels, such as RAID0, RAID1, RAID5, and so on.

With the development of RAID technology, data reading and writing are performed at the disk block level rather than at the disk level. According to this technique, each of a plurality of disks is divided into a plurality of physical disk blocks. The RAID is created by using the physical disk block as a unit. For example, the size of each disk block used to create the RAID is 4 GB. For a 4+1 RAID5 disk array, its storage capacity is 16 GB. However, there are still many problems to be solved in the disk array composed of disk blocks.

SUMMARY

Embodiments of the present disclosure provide a method, device and computer program product for rebuilding disk arrays.

According to a first aspect of the present disclosure, there is provided a method of rebuilding disk arrays. The method includes in response to receiving a message for rebuilding disk arrays in a storage system, determining a target disk that causes the rebuilding. The method further includes determining from the disk arrays a set of disk arrays related to the target disk. The method further includes generating a plurality of subsets of disk arrays from the set of disk arrays, each subset including a plurality of disk arrays that can be rebuilt in parallel. The method further includes determining, based on a number of disks included in each of the plurality of subsets, a target subset from the plurality of subsets. The method further includes rebuilding a plurality of disk arrays in the target subset in parallel.

According to a second aspect of the present disclosure, there is provided an electronic device. The electronic device includes a processor; and a memory having computer program instructions stored thereon which, when executed by the processor, cause the electronic device to perform acts including: in response to receiving a message for rebuilding disk arrays in a storage system, determining a target disk that causes the rebuilding; determining from the disk arrays a set of disk arrays related to the target disk; generating a plurality of subsets of disk arrays from the set of disk arrays, each subset including a plurality of disk arrays that can be rebuilt in parallel; determining, based on a number of disks included in each of the plurality of subsets, a target subset from the plurality of subsets; and rebuilding a plurality of disk arrays in the target subset in parallel.

According to a third aspect of the present disclosure, there is provided a computer program product that is tangibly stored on a non-volatile computer readable medium and includes machine-executable instructions. The machine-executable instructions, when executed, cause the machine to perform steps of the method according to the first aspect of the present disclosure.

BRIEF DESCRIPTION OF THE DRAWINGS

The above and other features, advantages and aspects of embodiments of the present disclosure will be made more apparent by describing example embodiments of the present disclosure in more detail with reference to figures. In the example embodiments of the present disclosure, the same reference signs usually represent the same element.

In all figures, the same or corresponding reference signs represent the same or corresponding parts.

DETAILED DESCRIPTION OF EMBODIMENTS

Figure 1:
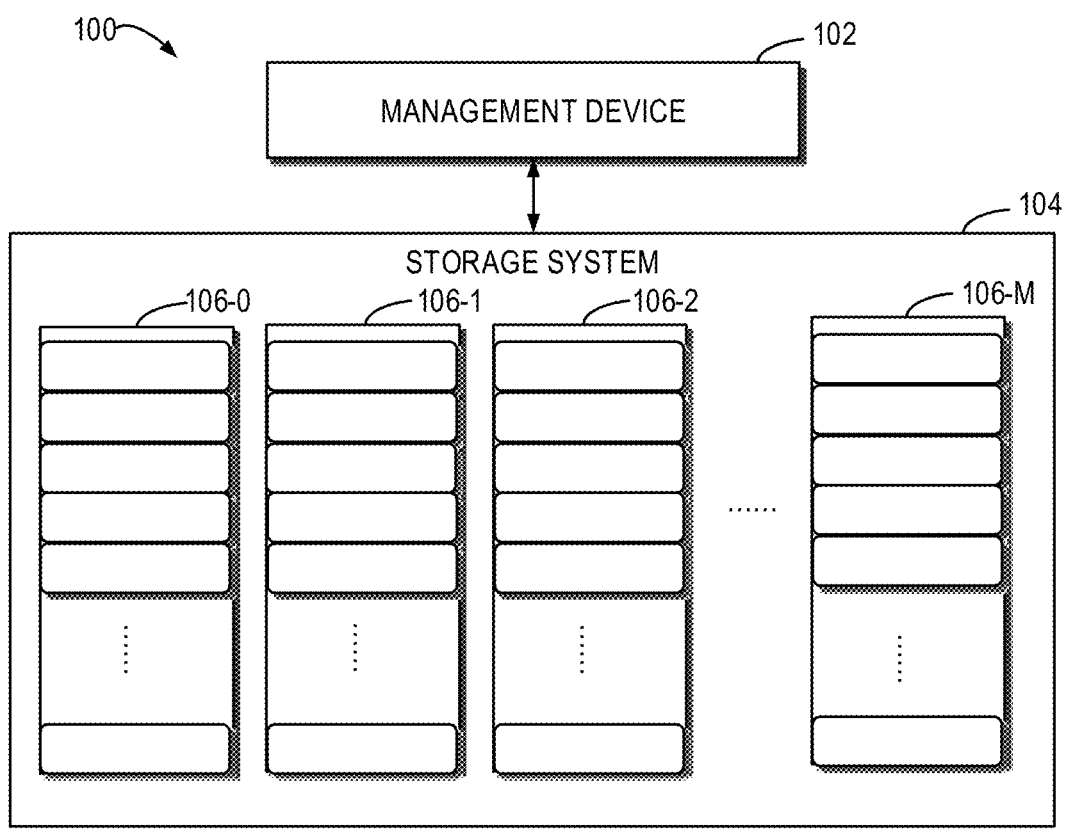
FIG. 1 illustrates a schematic diagram of an example environment 100 in which devices and/or methods according to embodiments of the present disclosure may be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described below in more detail with reference to figures. Although figures show preferred embodiments of the present disclosure, it should be appreciated that the present disclosure may be implemented in various forms and should not be limited by embodiments stated herein. On the contrary, these embodiments are provided for a more thorough and complete understanding of the present disclosure. It should be appreciated that figures and embodiments of the present disclosure are only used by way of example and not to limit protection scope of the present disclosure.

As described in embodiments of the present disclosure, the terms "includes", "comprises" or like terms should be understood as open-ended terms that mean "includes, but is not limited to." The term "based on" is to be read as "based at least in part on." The term "an embodiment" or "the embodiment" should be understood as "at least one embodiment". The terms "first", "second", etc. may refer to different or the same objects. Other explicit and implicit definitions might be included below.

The principles of the present disclosure are described below with reference to several example embodiments illustrated in the drawings. Although preferred embodiments of the present invention have been shown in the drawings, it should be understood that these embodiments are only intended to enable those skilled in the art to better understand and thereby implement the present disclosure, not to limit the scope of the present disclosure in any manner.

Generally, there are many disk arrays with the same disk array width in the storage system. Each disk array is formed by a plurality of disk blocks in a plurality of disks. However, the disks in the storage system might fail for some reason, causing the disks in the storage system to be unusable. When a disk in the storage system is unavailable, the disk is identified as offline. When the disk is offline beyond a predetermined period of time, for example, the offline duration exceeds 5 minutes, the disk array related to the disk in the storage system needs to be rebuilt to ensure the reliability of the data.

However, when the disk array is rebuilt, a management device first selects disk arrays formed by offline disks from the disk arrays. Then, the management device puts the disk arrays related to the offline disks into a list to be rebuilt in the selection order. When rebuilding starts, the management device takes the first N disk arrays out of the list to be rebuilt. The taken-out first N disk arrays are allocated to N cores of the management device to perform rebuilding in parallel, where each core is allocated a disk array.

During the rebuilding process for each disk array, the management device reads all disk array stripes from the disks associated with the disk array based on the width of the disk array. For example, if the disk array format is 4+1 RAID 5, when performing the rebuilding operation, the storage system needs to read the data on the other four disks except the offline disk and return the data to the management device. The management device then rebuilds the data on the offline disk based on the received data on the other four disks. Therefore, at least four read I/Os and one write I/O need to be generated during the rebuilding process. However, when rebuilding operations are performed in parallel, the disk arrays rebuilt in parallel may share the same disk (except for the offline disk). Reading data for different disk arrays on the same disk slows down the parallel rebuilding process, and therefore reduces the efficiency of parallel rebuilding.

In order to solve the above problems, the present disclosure proposes a method for rebuilding a disk array. In this method, a target disk (e.g., offline disk) that causes the rebuilding process for the disk array is first determined. Then, a set of disk arrays related to the target disk is determined. Then, a plurality of subsets of disk arrays are generated from the set of disk arrays. A target subset is determined from the plurality of subsets according to the number of disks included in each of the plurality of subsets. Then the plurality of disk arrays in the target subset are rebuilt. By the above method, a disk array that is most suitable for parallel rebuilding may be determined, and the process of rebuilding the disk array is sped up. Therefore, the delay caused by performing the rebuilding of the plurality of disk arrays on the same disk is reduced, and the efficiency of rebuilding the disk arrays is improved.

FIG. 1 illustrates a schematic diagram of an example environment 100 in which devices and/or methods according to embodiments of the present disclosure may be implemented.

As shown in FIG. 1, the example environment 100 includes a management device 102 and a storage system 104. The management device 102 manages the disk arrays in the storage system 104.

The storage system 104 is a storage medium that stores a large amount of data. The storage system 104 may include a variety of volatile and/or non-volatile data storage media. Examples of the storage media may include but are not limited to a magnetic disk, an optical disk, a hard disk, a solid state drive (SSD), and a cache. Alternatively or additionally, the storage system 104 may include the same type of storage media or different types of storage media.

The storage system 104 illustrated in FIG. 1 has a plurality of disks 106-0, 106-1, 106-2, . . . , 106-M, where M is a positive integer. For the convenience of description, the disks 106-0, 106-1, 106-2, . . . 106-M are also collectively hereinafter referred to as disks 106. Each disk in the storage system 104 is divided into a plurality of physical disk blocks, where the size of each physical disk block is the same. The number of physical disk blocks on each disk may be different or the same. The size of the physical disk block may be set as needed. In some embodiments, the size of the physical disk blocks for example may be 4 GB.

The physical disk blocks in the storage system 104 form disk arrays. Disk arrays have the same level. The formats of the disk arrays include but are not limited to RAID 0, RAID 1, RAID 0+1, RAID 2, RAID 3, RAID 4, RAID 5, RAID 7, RAID 10, and so on.

The management device 102 receives, from a user or an upper-layer application, requests for various operations on the disk array. The management device 102 also receives some requests and/or messages from the storage system 104 to perform some predetermined operations on the storage system 104. The management device 102 receives a message for rebuilding the disk array in the storage system 104. In some embodiments, if the disk in the storage system 104 is offline for more than a predetermined time period, such as 5 minutes, the storage system 104 may send a message to the management device 102. This message indicates that there is an offline disk in the storage system 104 and the disk arrays in the storage system 104 need to be rebuilt. The above examples are only used to describe the present disclosure, and not to specifically limit the present disclosure.

After receiving the message indicating that the disk array needs to be rebuilt, the management device 102 determines the target disk that causes the rebuilding, e.g., the offline disk that causes the rebuilding.

In some embodiments, metadata for each disk 106 is stored in the storage system 104. The metadata of the disk 106 includes status information indicating whether the disk 106 is offline. Therefore, after receiving the message indicating that the disk arrays need to be rebuilt, the management device 102 obtains the metadata of each disk 106 from the storage system 104. Alternatively or additionally, an indicator bit is set in the metadata of the disk 106. When the bit is 1, it indicates that the disk is online, when the bit is 0, it indicates that the disk is offline; alternatively, when the bit is 0, it indicates that the disk is online, and when the bit is 1, it indicates that the disk is offline.

In some embodiments, the storage system 104 has a predetermined storage region in which information of the target disk is stored. Therefore, the management device 102 may directly obtain the information of the target disk from the predetermined storage region to determine the target disk.

The above examples are only used to describe the present disclosure, but not to specifically limit the present disclosure. Those skilled in the art may determine the target disk that causes the rebuilding by any suitable method, and may also set the state information of the disk in any suitable form in the metadata according to needs.

After determining the target disk, the management device 102 determines the set of disk arrays related to the target disk. Therefore, the set of disk arrays formed by the target disk is determined. In some embodiments, the storage system 104 stores the metadata of the disk arrays. The metadata of the disk arrays includes identification information of a disk storing the data of the disk arrays. The management device 102 obtains metadata about the disk arrays from the storage system 104.

In some embodiments, the management device 102 obtains metadata of each disk array based on a logical address related to the disk array. For example, the management device 102 sends a logical address 0 to the storage system 104. The storage system 104 then determines the disk array corresponding to the logical address 0 in the metadata of the disk arrays, and then sends the metadata of the disk array corresponding to the logical address 0 to the management device 102. Then, the management device 102 determines the metadata of the disk array corresponding to next predetermined address. For example, the interval between the next predetermined address and the logical address 0 is the length of the disk array. Thereby, the management device 102 may obtain metadata for each disk array.

In some embodiments, the management device 102 determines a set of disk arrays based on the metadata of the disk arrays. By checking the identifiers of the disks in the metadata, the management device 102 may determine the set of disk arrays related to the target disk.

The management device 102 generates a plurality of subsets of the disk arrays from the set of disk arrays. Each subset includes a plurality of disk arrays that can be rebuilt in parallel. In some embodiments, a number of disk arrays rebuilt in parallel is the same as a number of cores in the management device 102. In some embodiments, the number of disk arrays rebuilt in parallel is the same as the number of available cores in the management device 102. The above examples are only used to describe the present disclosure, but not to specifically limit the present disclosure. Those skilled in the art may set the number of disk arrays rebuilt in parallel according to needs.

Then, the management device 102 determines the number of disks included in each subset, and determines a target subset from the plurality of subsets. Finally, the management device 102 rebuilds the plurality of disk arrays in the target subset.

In some embodiments, if there are multiple disk arrays that need to be rebuilt after the target subset is rebuilt, a new target subset to be rebuilt may be determined again until all disk arrays are rebuilt. In some embodiments, after the target subset is rebuilt, other disk arrays to be rebuilt may also be rebuilt by using the existing method. The above examples are only used to describe the present disclosure, rather than to specifically limit the present disclosure. Those skilled in the art may set other manners of rebuilding the disk arrays according to needs.

Figure 2:
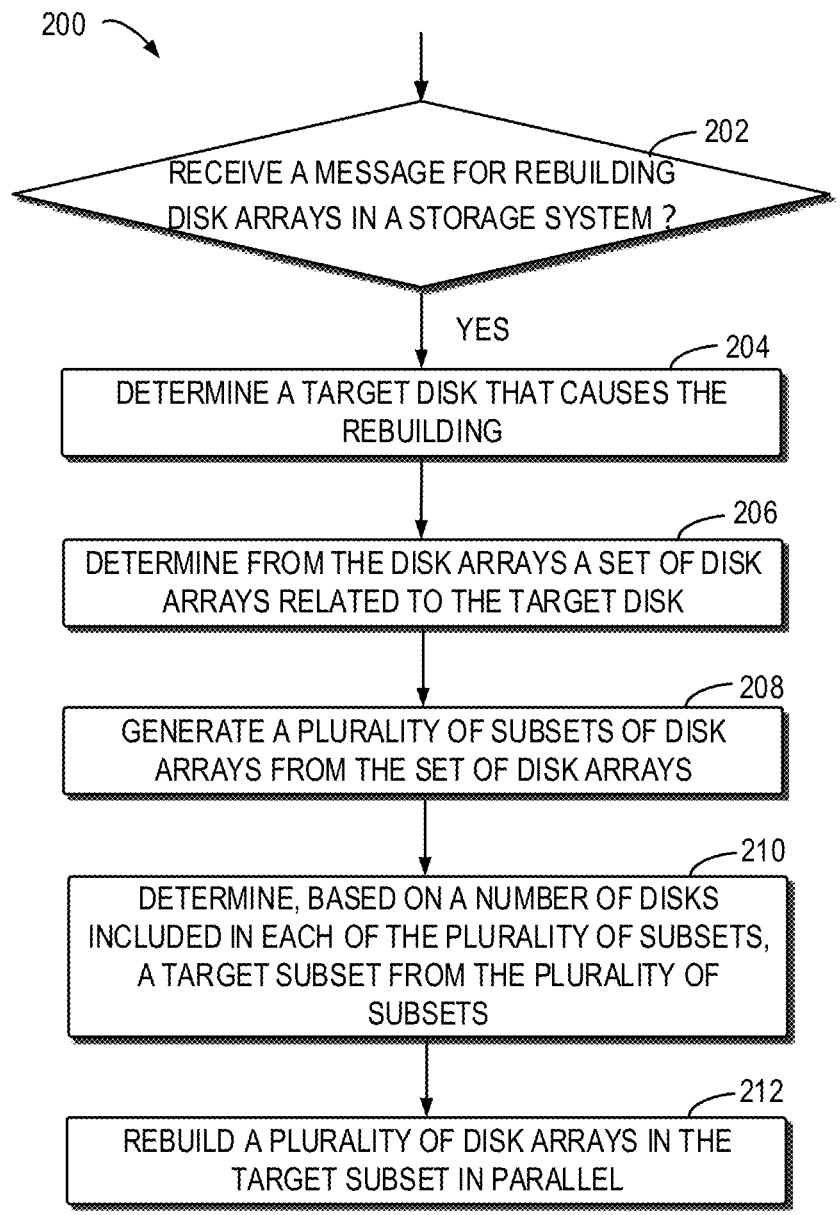
FIG. 2 illustrates a flowchart of a method 200 for rebuilding disk arrays according to an embodiment of the present disclosure.
Figure 3:
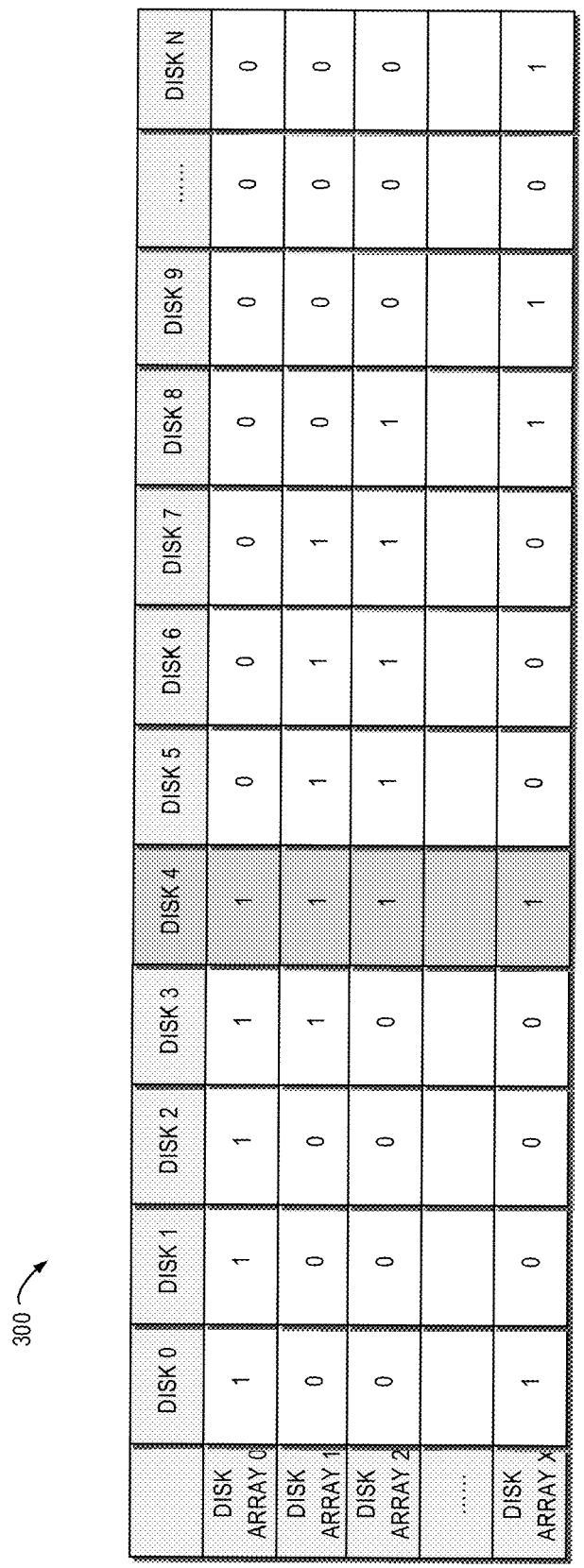
FIG. 3 illustrates a correspondence relationship table 300 between a disk array and disks according to an embodiment of the present disclosure.

The schematic diagram of the environment 100 in which devices and/or methods according to embodiments of the present disclosure may be implemented is described above with reference to FIG. 1. The process of rebuilding the disk array is described below with reference to FIG. 2 and FIG. 3. FIG. 2 illustrates a method 200 for rebuilding a disk array according to an embodiment of the present disclosure, where the method 200 may be performed at the management device 102 in FIG. 1 or any other suitable device. FIG. 3 illustrates a correspondence relationship table 300 between a disk array and disks according to an embodiment of the present disclosure.

At block 202, the management device 102 determines whether a message is received for rebuilding the disk array in the storage system 104. When the disk array needs to be rebuilt, the storage system 104 sends a message for rebuilding the disk array to the management device 102. Therefore, the management device 102 receives, from the storage system 104, the message for rebuilding the disk array.

In some embodiments, if the disk in the storage system 104 is offline for more than a predetermined time, such as 5 minutes, the storage system 104 may send a message to the management device 102. This message indicates that there is an offline disk in the storage system 104 and the disk arrays in the storage system 104 need to be rebuilt. The above examples are only used to describe the present disclosure, and not to specifically limit the present disclosure.

After determining that the message for rebuilding the disk array in the storage system 104 is received, at block 204, the management device 102 determines the target disk that causes the rebuilding. After the message is received, the management device first determines the target disk that causes the rebuilding, for example the offline disk.

In some embodiments, after receiving the message, the management device 102 obtains the status information of the disk 106 in the storage system 104. Alternatively or additionally, metadata for each disk 106 is stored in the storage system 104. The metadata of the disk 106 includes status information indicating whether the disk 106 is offline. Then, the management device 102 determines which disk 106 is the target disk according to the status information in the metadata of the disk 106.

At block 206, the management device 102 determines from the disk arrays a set of disk arrays related to the target disk. The disk arrays formed by the target disk need to be determined by the management device 102 from all the disk arrays of the storage system 104 to rebuild these disk arrays.

In some embodiments, the management device 102 obtains identifiers of a plurality of disks related to a plurality of disk arrays in the storage system 104. Alternatively or additionally, the management device 102 obtains the metadata of the disk array from the storage system 104, where the metadata of the disk array includes the identifiers of the disks forming the disk array. Using the identifiers of the disks, the management device 102 determines one or more disk arrays formed by the target disk. Then, the determined one or more disk arrays is used as a set of disk arrays. The above examples are only used to describe the present disclosure, and not to specifically limit the present disclosure.

In some embodiments, the management device 102 generates a correspondence relationship between a set of disk arrays and disks related to the set of disk arrays. For example, as shown in FIG. 3, the disk 4 is a target disk, and the management device 102 determines a correspondence relationship table 300 between the set of disk arrays related to the disk 4 and the disks. In this table, the disks include disk 0, disk 1, disk 2 to disk N, where N is a positive integer; the disk arrays include disk array 1, disk array 2 to disk array X, where X is a positive integer. The number 1 in the table 300 indicates that the disk array is formed by the disk, and the number 0 in the table 300 indicates that the disk does not form the disk array. In this example, the format of the disk arrays is 4+1 RAID5, so disk array 0 is formed by disk 0, disk 1, disk 2, disk 3 and disk 4; disk array 1 is formed by disk 3, disk 4, disk 5, disk 6 and disk 7; disk array 2 is formed by disk 4, disk 5, disk 6, disk 7 and disk 8; disk array X is formed by disk 1, disk 4, disk 8, disk 9 and disk N; where disk 4 is the offline disk.

Returning to FIG. 2, at block 208, the management device 102 generates from the set of disk arrays a plurality of subsets of disk arrays. Each subset includes a plurality of disk arrays that can be rebuilt in parallel.

In some embodiments, the management device 102 obtains a number of cores of the computing resources of the storage system 104. In one example, the number of cores is a total number of cores in the computing resources. In one example, the number of cores is the number of available cores in the computing resources. The forgoing example is only used to describe the present disclosure, but not to specifically limit the present disclosure. Those skilled in the art may set the number of cores as needed.

After determining the number of cores, the management device 102 may determine the number of disk arrays in each subset. Then, the management device 102 generates a plurality of subsets from the set of disk arrays, and the number of disk arrays included in each subset is equal to the determined number of cores. Therefore, the number of cores is the same as the number of disk arrays in the subset. In this way, each core may process one disk array, thereby achieving parallel rebuilding of the plurality of disk arrays.

In some embodiments, a plurality of disk arrays are selected from the set of disk arrays to form a subset of disk arrays and the number of the disk arrays in the subset corresponds to the number of cores. Alternatively or additionally, the plurality of subsets includes all subsets that is from the disk arrays, where the number of the disk arrays in each subset is the same as the number of cores.

At block 210, the management device 102, based on the number of disks included in each of the plurality of subsets, determines a target subset from the plurality of subsets. The target subset determined by the management device 102 is the subset of the disk arrays selected for parallel execution. The process of determining the target subset will be described below with reference to FIG. 4 and FIG. 3.

At block 212, the management device 102 rebuilds the plurality of disk arrays in the target subset in parallel. After selecting the target subset, the management device 102 may put the disk arrays in the determined target subset into respective cores for parallel execution to rebuild these disk arrays.

By the above method, a disk array that is most suitable for parallel rebuilding may be determined, which speeds up the process of rebuilding the disk array. Therefore, the delay caused by performing the rebuilding of the plurality of disk arrays on the same disk is reduced, and the efficiency of rebuilding the disk arrays is improved.

Figure 4:
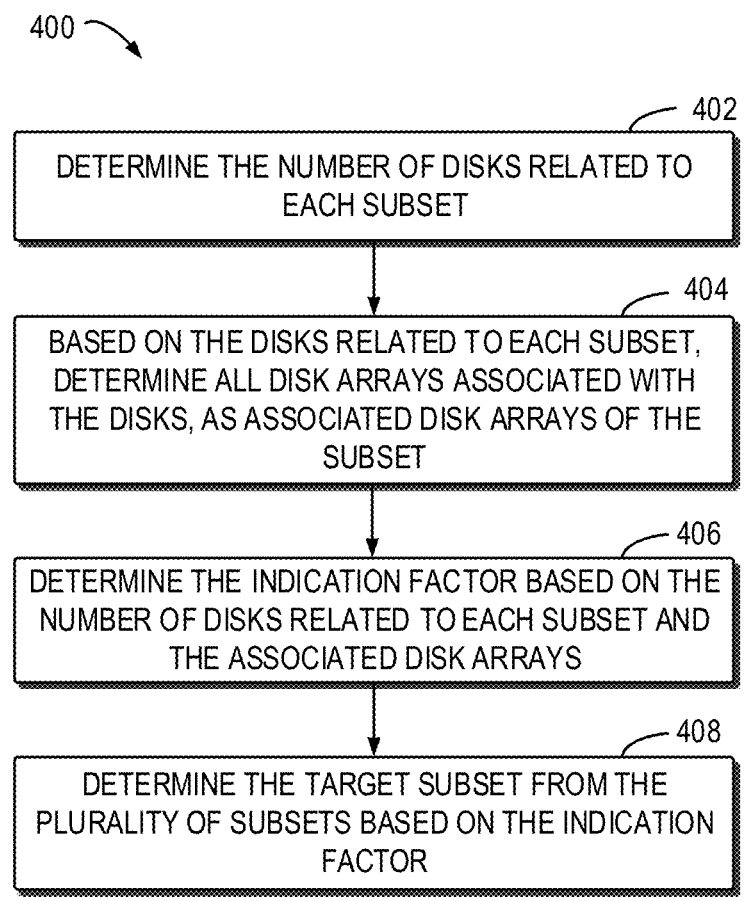
FIG. 4 illustrates a flowchart of a method 400 for determining a target subset according to an embodiment of the present disclosure.

In the above, FIG. 2 illustrates the flowchart of the method 200 for rebuilding a disk array according to an embodiment of the present disclosure. The operation at block 210 in FIG. 2 will be described below with reference to FIG. 4 and FIG. 3. FIG. 4 illustrates a flowchart of a method 400 for determining a target subset according to an embodiment of the present disclosure. The method 400 in FIG. 4 may be performed by the management device 102 in FIG. 1 or any other suitable device.

When determining the target subset from the plurality of subsets, the management device 102 generally determines, based on the number of disks included in each of the plurality of subsets, an indication factor of each subset in the plurality of subsets. The indication factor indicates a ratio of the total number of associated disk arrays of each subset to the number of disks related to each subset. Then, the indication factor is used to determine the target subset from the plurality of subsets.

At block 402, the management device 102 determines the number of disks related to each subset. After determining the set of disk arrays related to the target disk, the management device 102 obtains metadata related to each disk array in the set of disk arrays from the storage device 104. The metadata of the disk array includes identifiers of the disks forming the disk array. Therefore, the management device 102 obtains the relationship between the set of disk arrays and the disks.

For example, as shown in FIG. 3, the management device 102 stores a correspondence relationship between the set of disk arrays and the disks. Therefore, the management device 102 may determine the number of disks related to each subset based on FIG. 3.

Returning to FIG. 4, at block 404, based on the disks associated with each subset, the management device 102 determines all disk arrays associated with the disks as associated disk arrays of the subset. In order to determine the target disk array, the management device 102 further determines the disk array in the subset on each disk related to each subset, as the associated disk array of the disk.

For example, as shown in FIG. 3, if the subset includes disk array 0 and disk array 1, the disks related to disk arrays 0 and 1 are disk 0-disk 3 and disk 5-disk 7, and disk 4 is a failed disk and therefore will not be considered. At this time, the disk array associated with disk 0 is disk array 0 and the number of associated disk arrays is 1; the disk array associated with disk 1 is disk array 0 and the number of associated disk arrays is 1; the disk array associated with disk 2 is disk array 0, and the number of associated disk arrays is 1; the disk arrays associated with disk 3 are disk arrays 0 and 1, and the number of associated disk arrays is 2; the disk array associated with disk 5 is disk array, 1, the number of associated disk arrays is 1; the disk array associated with disk 6 is disk array 1, the number of associated disk arrays is 1; the disk array associated with disk 7 is disk array 1, and the number of associated disk arrays is 1.

Returning to FIG. 4, at block 406, the management device 102 determines an indication factor based on the number of disks associated with each subset and the associated disk array.

After determining the number of disk arrays of each disk in the subset, the management device 102 sums the number of associated disk arrays on each disk, and then determines an average disk array value mean on each disk in the subset. mean is an indication factor, and determined by the following Equation (1):

$$\text{mean}=\text{sum}/W \qquad (1)$$

where mean represents the average disk array value on each disk in the subset, and sum represents the sum of the number of associated disk arrays on all the disks in the subset, where the sum of the number of associated disk arrays on all the disks in each subset is the same; W represents all the disks (not including the offline disk) forming the disk array in the subset.

At block 408, based on the indication factor, the management device 102 determines the target subset from the plurality of subsets. The management device 102 determines the target subset from the plurality of subsets based on the indication factor of each subset. In some embodiments, the management device 102 selects the subset with the smallest indication factor as the target subset.

In some embodiments, if a minimum indication factor corresponds to a plurality of different subsets, the target subset may be further selected by calculating a variance for the subset. The variance is determined by the following Equation (2):

$$\text{variance}=\Sigma(M-\text{mean})^2/(W-1) \qquad (2)$$

where M represents a value of the disk array of each disk in the subset, mean represents a value of an average disk array value of each disk in the subset obtained by the above Equation (1), W represents the number of disks forming the disk array in the subset, and $\Sigma$ represents summing all disks in the subset.

By the above method, the target subset may be determined quickly and accurately from the plurality of subsets. The efficiency of determining the target subset is improved, the time for determination is reduced, and the performance of the management device is improved.

Figure 5:
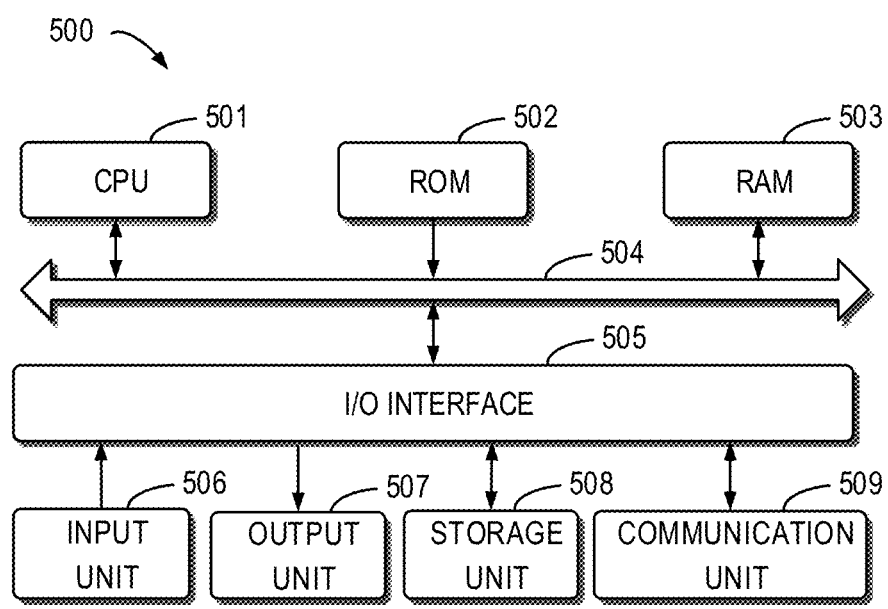
FIG. 5 illustrates a schematic block diagram of an example device 500 adapted to implement embodiments of the present disclosure.

FIG. 5 illustrates a schematic block diagram of an example device 500 that may be used to implement an embodiment of the content of the present disclosure. For example, the management device 102 shown in FIG. 1 may be implemented by the device 500. As shown, the device 500 includes a central processing unit (CPU) 501 which is capable of performing various proper actions and processes in accordance with a computer program instruction stored in a read only memory (ROM) 502 or a computer program instruction loaded from a storage unit 508 to a random access memory (RAM) 503. Various programs and data needed in the operation of the device 500 may also be stored in the RAM 503. The CPU 501, the ROM 502 and the RAM 503 are connected to one another via a bus 504. An input/output (I/O) interface 505 is also connected to the bus 504.

The following components in the device 500 are connected to the I/O interface 505: an input unit 506 including a keyboard, a mouse, or the like; an output unit 507, e.g., various displays and loudspeakers; a storage unit 508 such as a magnetic disk, an optical disk or the like; and a communication unit 509 such as a network card, a modem, a radio communication transceiver. The communication unit 509 allows the device 500 to exchange information/data with other devices via a computer network such as Internet and/or various telecommunication networks.

The above-described procedures and processes such as methods 200 and 400 may be implemented by the processing unit 501. For example, in some embodiments, the methods 200 and 400 may be implemented as a computer software program, which is tangibly included in a machine-readable medium such as the storage unit 508. In some embodiments, part or all of the computer program may be loaded and/or installed on the device 500 via the ROM 502 and/or the communication unit 509. When the computer program is uploaded to the RAM 503 and executed by the CPU 501, one or more acts of the above methods 200 and 400 may be implemented.

The present disclosure may be a method, a device, a system and/or a computer program product. The computer program product may include a computer readable storage medium (or media) having computer readable program instructions thereon for carrying out aspects of the present disclosure.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, may be implemented by computer readable program instructions.

These computer readable program instructions may be provided to a processing unit of a general purpose computer, special purpose computer, or other programmable data processing apparatus to produce a machine, such that the instructions, which execute via the processor of the computer or other programmable data processing apparatus, create means (e.g., specialized circuitry) for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein includes an article of manufacture including instructions which implement aspects of the functions/acts specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which includes one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of rebuilding disk arrays, comprising:
   in response to receiving a message for rebuilding disk arrays in a storage system, determining a target disk that causes the rebuilding;
   determining from the disk arrays a set of disk arrays related to the target disk;
   generating a plurality of subsets of disk arrays from the set of disk arrays, each subset including a plurality of disk arrays that can be rebuilt in parallel;
   determining, based on a number of disks included in each of the plurality of subsets, a target subset from the plurality of subsets; and
   rebuilding a plurality of disk arrays in the target subset in parallel, wherein determining the target subset comprises:
      determining, based on the number of disks included in each of the plurality of subsets, an indication factor of each subset in the plurality of subsets, the indication factor indicating a ratio of a total number of associated disk arrays of each subset to a number of disks related to each subset; and
      determining the target subset from the plurality of subsets based on the indication factor.

2. The method according to claim 1, wherein determining the target disk comprises:
   in response to receiving the message, obtaining status information of a plurality of disks related to the plurality of disk arrays in the storage system; and
   in accordance with a determination that the status information indicates one disk of the plurality of disks being offline, determining the disk as the target disk.

3. The method according to claim 1, wherein determining the set of disk arrays comprises:
   obtaining identifiers of a plurality of disks related to the plurality of disk arrays in the storage system;
   determining, based on the identifiers, one or more disk arrays formed by the target disk; and
   determining the determined one or more disk arrays as the set of the disk arrays.

4. The method according to claim 3, wherein obtaining the identifiers comprises:
   obtaining metadata related to the plurality of disk arrays; and determining, from the metadata, an identifier of each disk related to the plurality of disk arrays.

5. The method according to claim 1, wherein determining the indication factor comprises:
   determining the number of disks related to each subset;
   based on the disks related to each subset, determining all disk arrays associated with the disks, as associated disk arrays of the subset; and
   determining the indication factor based on the number of disks related to each subset and the associated disk arrays.

6. The method according to claim 1, wherein generating the plurality of subsets from the set of disk arrays comprises:
   obtaining a number of cores of computing resources of the storage system;
   determining a number of disk arrays in each subset based on the number of the cores; and
   generating the plurality of subsets from the set of disk arrays, the number of disk arrays included in each subset being equal to the determined number.

7. The method of claim 1, wherein determining the indication factor of each subset in the plurality of subsets includes:
   identifying a set of disks included in a subset in the plurality of subsets;
   identifying a number of disks in the set of disks;
   identifying, for each disk of the set of disks, a number of associated disk arrays that contain the respective disk; and
   calculating a total number of associated disk arrays for the subset by summing the number of associated disk arrays for each disk of the set of disks,
   wherein the ratio for the subset is computed based on the total number of associated disk arrays for the subset and the number of disks in the set of disks.

8. The method of claim 7, wherein the disks in the set of disks form the disk arrays in the subset, and wherein identifying the number of disks related to the subset includes calculating the number of disks related to the subset based on the number of disks in the set of disks.

9. The method of claim 7, wherein determining the target subset includes:
   identifying, from the plurality of subsets, a set of subsets based on the indication factor of each subset in the plurality of subsets;
   calculating, for each subset in the set of subsets, a respective variance based on a difference between the number of associated disk arrays for each disk in the respective subset and the respective indication factor; and
   determining the target subset based on the variance of each subset in the set of subsets.

10. An electronic device, comprising:
    a processor; and
    a memory having computer program instructions stored thereon which, when executed by the processor, cause the electronic device to perform acts comprising:
      in response to receiving a message for rebuilding disk arrays in a storage system, determining a target disk that causes the rebuilding;
      determining from the disk arrays a set of disk arrays related to the target disk;
      generating a plurality of subsets of disk arrays from the set of disk arrays, each subset including a plurality of disk arrays that can be rebuilt in parallel;
      determining, based on a number of disks included in each of the plurality of subsets, a target subset from the plurality of subsets; and
      rebuilding a plurality of disk arrays in the target subset in parallel,
      wherein generating the plurality of subsets from the set of disk arrays comprises:
        obtaining a number of cores of computing resources of the storage system;
        determining a number of disk arrays in each subset based on the number of the cores; and
        generating the plurality of subsets from the set of disk arrays, the number of disk arrays included in each subset being equal to the determined number.

11. The electronic device according to claim 10, wherein determining the target disk comprises:
    in response to receiving the message, obtaining status information of a plurality of disks related to the plurality of disk arrays in the storage system; and
    in accordance with a determination that the status information indicates one disk of the plurality of disks is offline, determining the disk as the target disk.

12. The electronic device according to claim 10, wherein determining the set of disk arrays comprises:
    obtaining identifiers of a plurality of disks related to the plurality of disk arrays in the storage system;
    determining, based on the identifiers, one or more disk arrays formed with the target disk; and
    determining the determined one or more disk arrays as the set of the disk arrays.

13. The electronic device according to claim 12, wherein obtaining the identifiers comprises:
    obtaining metadata related to the plurality of disk arrays; and
    determining, from the metadata, an identifier of each disk related to the plurality of disk arrays.

14. The electronic device according to claim 10, wherein determining the target subset comprises:
    determining, based on the number of disks included in each of the plurality of subsets, an indication factor of each subset in the plurality of subsets, the indication factor indicating a ratio of a total number of associated disk arrays of each subset to a number of disks related to each subset; and
    determining the target subset from the plurality of subsets based on the indication factor.

15. The electronic device according to claim 14, wherein determining the indication factor comprises:
    determining the number of disks related to each subset;
    based on the disks related to each subset, determining all disk arrays associated with the disks, as associated disk arrays of the subset; and
    determining the indication factor based on the number of disks related to each subset and the associated disk arrays.

16. A computer program product having a non-transitory computer readable medium which stores a set of instructions to rebuild disk arrays; the set of instructions, when carried out by computerized circuitry, causing the computerized circuitry to perform a method of:
    in response to receiving a message for rebuilding disk arrays in a storage system, determining a target disk that causes the rebuilding;
    determining from the disk arrays a set of disk arrays related to the target disk;

generating a plurality of subsets of disk arrays from the set of disk arrays, each subset including a plurality of disk arrays that can be rebuilt in parallel;

determining, based on a number of disks included in each of the plurality of subsets, a target subset from the plurality of subsets; and rebuilding a plurality of disk arrays in the target subset in parallel, wherein determining the target subset comprises:

determining, based on the number of disks included in each of the plurality of subsets, an indication factor of each subset in the plurality of subsets, the indication factor indicating a ratio of a total number of associated disk arrays of each subset to a number of disks related to each subset; and determining the target subset from the plurality of subsets based on the indication factor.

* * * * *